Sept. 2, 1952  B. J. MAYLAND  2,609,382
PRODUCTION OF HYDROCARBON SYNTHESIS GAS
Filed Dec. 31, 1948
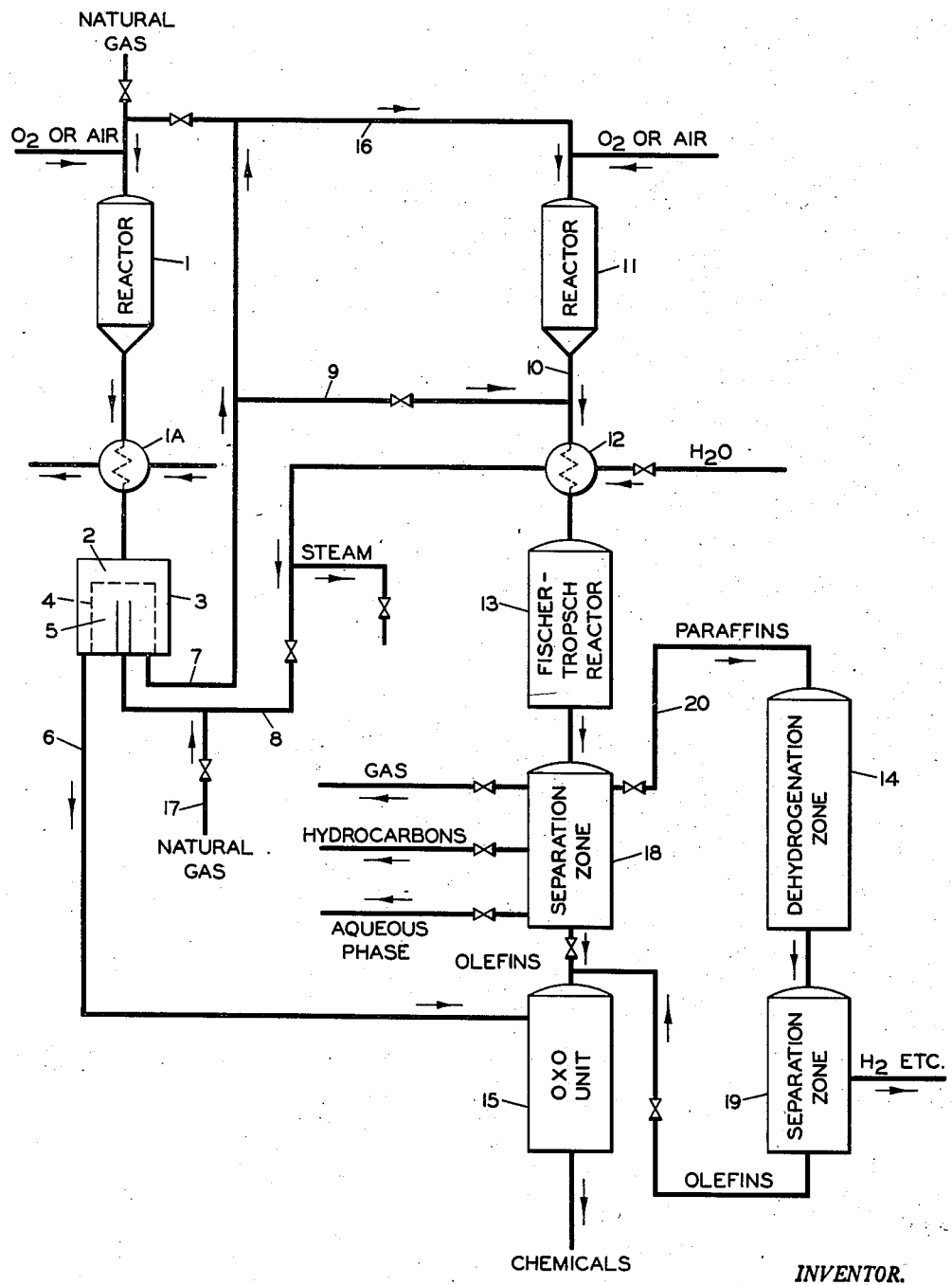
INVENTOR.
B. J. MAYLAND
BY Hudson & Young
ATTORNEYS Patented Sept. 2, 1952

2,609,382

UNITED STATES PATENT OFFICE 2,609,382

PRODUCTION OF HYDROCARBON SYNTHESIS GAS

Bertrand J. Mayland, Bartlesville, Okla., assignor to Phillips Petroleum Company, a corporation of Delaware Application December 31, 1948, Serial No. 68,466

2 Claims. (Cl. 260—449.6)

This invention relates to the treatment of natural gas to produce a synthesis gas, that is, a gas containing hydrogen and carbon monoxide. In one of its embodiments the invention provides a process for the production of a synthesis gas having a low ratio of hydrogen to carbon monoxide and a synthesis gas having a relatively high ratio of hydrogen to carbon monoxide. In another embodiment the invention provides a process for the production of a synthesis gas having a low ratio of hydrogen to carbon monoxide from a single stream of natural gas and oxygen, or air, without the formation of any by-products or materials unutilizable in the process. In still another embodiment of the invention there is provided a unitary process for the production of chemicals, such as aldehydes, alcohols, etc., from natural gas.

The production of synthesis gas, a mixture of hydrogen and carbon monoxide, is a well known art. It is known to produce synthesis gas from natural gas by the partial oxidation thereof with oxygen or air. The gas thus obtained will usually have a hydrogen to carbon monoxide ratio of somewhat less than two, the exact value depending upon the composition of the gas, operating conditions and the relative quantities present of the two reactants.

Synthesis gases of various hydrogen to carbon monoxide ratios are required for different processes. The mere partial combustion of natural gas and oxygen will not yield the ratios required in the different known processes using synthesis gas as a feed stock. Thus, in the Fischer-Tropsch hydrocarbon synthesis or in the methanol synthesis process a ratio of hydrogen to carbon monoxide of two is desired. On the other hand in the Oxo process for the production of valuable chemicals from certain hydrocarbons a ratio of hydrogen to carbon monoxide of the order of one is desired.

The prior art employs a number of different methods to vary the ratio of hydrogen to carbon monoxide in synthesis gas. Thus, the ratio can be increased by adding steam to the reactants during the partial combustion of the natural gas. It can also be increased by effecting the water gas shift reaction on the products of the partial combustion over a suitable catalyst with enough steam to cause the desired shift. Also, the ratio of the hydrogen to carbon monoxide can be reduced by the addition of carbon dioxide to the reactants in the production of the synthesis gas. This method of reducing the ratio of the hydrogen to carbon monoxide in a synthesis gas is undesirable because of excessive carbon deposition which occurs or because of the large excesses of the rather expensive carbon dioxide which must be used. It is evident from the natures of all of the foregoing methods of the art for altering the hydrogen to carbon monoxide ratio of a synthesis gas that side-reactions resulting in unwanted or undesirable materials with concomitant wastage of starting materials will occur in each and particularly that in the known method for reducing this ratio the carbon dioxide, which is used, is expensive and must be used in large excesses.

According to this invention there is provided a process for altering the hydrogen to carbon monoxide ratio of a synthesis gas, particularly to reduce the same, employing purely physical means thereby avoiding entirely the unwanted materials formed in the prior art processes as well as the concomitant wastage and great expense which has been involved.

Furthermore, there is provided, according to this invention, a process for the production of a high hydrogen to carbon monoxide ratio synthesis gas forming at the same time one of a low hydrogen to carbon monoxide ratio employing a novel combination of steps to this end and in such manner that both the high and low ratio gases can be used without any further intermediate processing steps to produce valuable hydrocarbons and/or chemical products.

Still further according to this invention there is provided a novel combination of steps to effect the production of said hydrocarbons and chemicals from said high and low ratio gases.

It has been found that hydrogen and carbon monoxide, in a synthesis gas, as derived from a synthesis gas producer will diffuse at widely different rates through a suitable porous partition. It has also been found that the hydrogen will diffuse at a rate so rapid in respect of the rate of diffusion of the carbon monoxide, in the synthesis gas, that it becomes possible to form a stream substantially richer in hydrogen than the synthesis gas and a stream considerably poorer in hydrogen than the synthesis gas.

Thus, according to this invention there is provided a process for the altering of the ratio of hydrogen to carbon monoxide in a synthesis gas by subjecting the same to conditions under which the components thereof will diffuse at widely different rates through a permeable partition, or permeable physical boundary, composed of a suitable porous material to form two streams of gases, one richer in hydrogen and another poorer in hydrogen than the starting synthesis gas. No chemical reaction is involved and the alteration of the hydrogen to carbon monoxide ratio occurs without any attendant formation of unwanted materials or wastage of synthesis gas or use of other expensive starting materials required in the prior art.

As the partition member there can be employed a number of different materials among which are screens woven from wires, ribbons, heat resistant cloths, etc. Perforated or slotted plates can be employed. Also, certain unglazed refractory materials such as silica, alundum, porcelain, etc., can be employed.

To operate the process in a continuous manner with a high degree of efficiency and to prevent loss in diffusion rate provision is made for an entrainer substance, for example steam, or even natural gas, to remove the diffused gas from the side of the partition to which it has diffused.

To more fully set forth the invention and to illustrate the same in one of its embodiments reference is now made to the drawing in which is shown diagrammatically a process for the production of both a low hydrogen to carbon monoxide ratio synthesis gas and a high hydrogen to carbon monoxide ratio synthesis gas, using as a starting gas a synthesis gas produced by the partial combustion of natural gas with oxygen, or air, to produce valuable hydrocarbons and chemicals in a unitary process having certain features and possessing certain advantages not heretofore attainable. In the drawing natural gas is fed together with oxygen or air to combustor or reactor 1 in which partial oxidation occurs to produce synthesis gas in a manner known to the art. From reactor 1 the synthesis gas is passed into heat exchanger 1A, cooled to below 1000° F., and passed to section 2 of a diffusion unit 3. Diffusion unit 3 contains a suitable diffusion partition 4. Hydrogen and carbon monoxide will diffuse through partition 4 at different rates such that the hydrogen content of the gas in section 2 will be substantially reduced and a gas enriched in hydrogen will be formed in section 5 of the unit. The low hydrogen content gas is withdrawn from section 2 through line 6 for use as described below. The gas enriched in hydrogen is withdrawn from section 5, through line 7. To assist in the withdrawal of the gas enriched in hydrogen and to maintain a high diffusion rate through partition 4, an entrainer medium, in this case steam, is fed into unit 3 through line 8 and caused to impinge upon partition 4, as shown. The static pressure in sections 2 and 5 is to be maintained substantially the same so that the transfer of gas from one section to the other will take place substantially only by diffusion. A portion of the gas withdrawn through line 7 is passed through line 9 to line 10 where it is admixed with and quenches synthesis gas produced in reactor 11 by partial oxidation of natural gas therein, thus forming a composite synthesis gas having a hydrogen to carbon monoxide ratio of about 2:1. Thus, it is that according to this invention both a synthesis gas of a low hydrogen to carbon monoxide ratio and one of a high ratio can be produced efficiently, readily and without any formation of the unwanted materials of the prior art or wastage of starting materials.

The composite synthesis gas stream formed in line 10 can be withdrawn through cooler 12 and can have a hydrogen to carbon monoxide ratio making it directly usable in a Fischer-Tropsch reaction for the preparation of hydrocarbons.

The ratio of hydrogen to carbon monoxide in the synthesis gas removed from diffusion chamber 3 through line 6 is such that this gas can be used directly in the Oxo process for the preparation of chemicals such as aldehydes and ketones by reaction with hydrocarbons, olefinic in character, which can be obtained either directly from the Fischer-Tropsch product or by dehydrogenation in zone 14 of Fischer-Tropsch paraffins produced in zone 13. Such dehydrogenated hydrocarbons are then passed to an Oxo unit 15.

Certain Fischer-Tropsch catalysts, particularly reduced and promoted iron oxide catalysts, produce olefins in considerable proportions when used to catalyze the synthesis of hydrocarbons from carbon monoxide and hydrogen at about 600° F. This type of catalyst is advantageously used in my process. In such a case, the effluent from reactor 13 is passed to separation zone 18. This zone may comprise several conventional separation steps, such as partial condensation, phase separation, fractional distillation, solvent extraction, extractive distillation, etc. The effluent is here resolved into several fractions. A gas fraction comprising hydrogen and methane is withdrawn and may be recycled to reactor 1 or 11. A liquid hydrocarbon product, which may comprise paraffins or paraffins and some of the synthesized olefins is withdrawn and further processed to obtain fuels or other products. An aqueous phase containing dissolved oxygenated by-products is also recovered and processed as desired for chemical recovery. A fraction comprising at least one olefin (e. g. hexene-1 or octene-1 or a mixture of olefins) is passed to Oxo unit 15 for catalytic reaction with carbon monoxide and hydrogen to produce aldehydes and/or alcohols by known methods. A catalyst comprising cobalt and thoria supported on kieselguhr may be used.

It is also within the scope of the invention to recover a fraction comprising one or more paraffins in zone 18 and pass this fraction to dehydrogenation zone 14 to obtain additional amounts of olefins for the Oxo reaction. Catalytic dehydrogenation at 1000–1200° F. with a chromia-containing catalyst is suitable. The olefins produced are freed of hydrogen and other light gases in separation zone 19 and passed to Oxo unit 15.

It is, of course, within the scope of the invention to produce all the olefin feed to Oxo unit 15 by the Fischer-Tropsch synthesis in reactor 13. It is also within the scope of the invention to produce a predominantly paraffinic synthesis product, as by use of a cobalt catalyst, and produce the entire olefin charge for unit 15 by dehydrogenation in zone 14.

Thus, according to this invention a unitary process is provided for the production of chemicals from natural gas.

If desired, some of the gas withdrawn from the diffusion unit through line 7 can be passed through line 16 to the second combustor or reactor 11 wherein it will serve to still further increase the hydrogen to carbon monoxide ratio of the synthesis gas produced therein.

According to the invention it has been found that some or all of the sweeping medium employed can be natural gas, or its equivalent, and when it is employed as such, that no appreciable adverse reaction occurs during the sweeping of the hydrogen rich synthesis gas from the diffusion unit. The natural gas may be used either alone or together with steam. It has also been found that the admixture of the natural gas sweeping medium and the hydrogen-rich synthesis gas which results, when natural gas is employed, can be passed directly, without any intermediate treatment, into reactor 11 wherein in the presence of steam the water gas shift reaction to produce more hydrogen will occur simultaneously with the partial combustion of the natural gas without oxidation of the hydrogen in the admixture of an extent to prove disadvantageous to the overall operation.

Thus, according to the invention, some or all of the entrainer gas employed may be natural gas in which event substantially all of the effluent in line 7 can be passed to reactor 11 through line 16. When natural gas is employed as a sweeping medium it can be introduced through line 17 or at any other convenient place.

The following example is illustrative of some of the principal features of the invention.

*Example*

100 mols of product obtained in the combustion in reactor (1) consisting of 40 mols of CO and 60 mols of $H_2$ are treated with 165 mols of steam in the diffusion unit. About 20 mols consisting of 15.6 mols of hydrogen and 4.4 mols of carbon monoxide are removed in the steam leaving 80 mols of synthesis gas having a hydrogen to carbon monoxide ratio of 1.25. The steam and hydrogen concentrate are added to the products of combustor (2) in which the amount and composition of synthesis gas produced is about the same as in combustor (1). 120 mols of synthesis gas are obtained having a hydrogen to carbon monoxide ratio of 1.7. Putting some of the steam and hydrogen concentrate in the reactant stream to combustor (2) a further increase in the synthesis gas hydrogen to carbon monoxide ratio can be realized.

I claim:

1. In a process for the preparation of a feed for a Fischer-Tropsch synthesis and for an Oxo catalytic chemical synthesis operation wherein a first and a second portion of natural gas are subjected to partial oxidation to form a synthesis gas comprising hydrogen and carbon monoxide, and said products of partial oxidation of said second natural gas portion are subjected to Fischer-Tropsch synthesis, the improvement which comprises subjecting products of partial combustion of said first portion of natural gas directly and without intermediate treatment to a diffusion by passing said gas into contact with one side of a porous physical partition; passing an entrainer medium consisting essentially of a third portion of natural gas over the opposite side of said partition; maintaining substantially the same static pressure on both sides of the partition, thus obtaining the diffusion of hydrogen and carbon monoxide to said opposite side of said partition, the hydrogen diffusing at a rate substantially greater than the carbon monoxide; withdrawing from said one side of said partition a synthesis gas having a substantially lower hydrogen content than the starting synthesis gas and from the opposite side of said partition said entrainer medium containing a synthesis gas having a substantially higher hydrogen content than the starting synthesis gas; combining at least a portion of said entrainer medium containing said synthesis gas having a higher hydrogen content than the starting synthesis gas with said products of partial combustion of said second natural gas portion prior to said Fischer-Tropsch synthesis; and mixing olefinic hydrocarbons with said synthesis gas having a hydrogen content substantially lower than the synthesis gas treated, thereby forming a feed suitable for Oxo catalytic chemical synthesis.

2. The process of claim 1 wherein at least a portion of said entrainer medium containing a synthesis gas having a substantially higher hydrogen content than the starting synthesis gas is combined with said second natural gas portion prior to partial oxidation.

BERTRAND J. MAYLAND.

REFERENCES CITED

The following references are of record in the file of this patent:

UNITED STATES PATENTS

| Number | Name | Date |
| --- | --- | --- |
| 1,174,631 | Snelling | Mar. 7, 1916 |
| 1,496,757 | Lewis et al. | June 3, 1924 |
| 2,159,434 | Frey | May 23, 1939 |
| 2,253,607 | Boyd | Aug. 26, 1941 |
| 2,255,069 | Maier | Sept. 9, 1941 |
| 2,347,682 | Gunness | May 2, 1944 |
| 2,360,463 | Arveson | Oct. 17, 1944 |
| 2,497,898 | McGurl | Feb. 21, 1950 |

FOREIGN PATENTS

| Number | Country | Date |
| --- | --- | --- |
| 22,340 | Great Britain | Dec. 21, 1891 |
| 308,792 | Great Britain | Aug. 11, 1930 |

OTHER REFERENCES

Ser. No. 373,703, Martin (A. P. C.), published July 13, 1943.